(12) United States Patent
Viger et al.

(10) Patent No.: US 9,532,380 B2
(45) Date of Patent: Dec. 27, 2016

(54) WIRELESS DATA EXCHANGE IN A NETWORK COMPRISING COLLABORATIVE NODES

(71) Applicant: CANON KABUSHIKI KAISHA, Tokyo (JP)

(72) Inventors: Pascal Viger, Janze (FR); Patrice Nezou, St Sulpice la Forêt (FR)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 14/074,064

(22) Filed: Nov. 7, 2013

(65) Prior Publication Data
US 2014/0133495 A1 May 15, 2014

(30) Foreign Application Priority Data
Nov. 9, 2012 (GB) .................................. 1220234.7

(51) Int. Cl.
*H04W 74/08* (2009.01)
(52) U.S. Cl.
CPC ................................ *H04W 74/0816* (2013.01)
(58) Field of Classification Search
None
See application file for complete search history.

(56) References Cited

U.S. PATENT DOCUMENTS

| 2005/0147071 | A1 | 7/2005 | Karaoguz et al. | |
|---|---|---|---|---|
| 2005/0207448 | A1* | 9/2005 | Iyer | H04L 12/4633 370/476 |
| 2006/0140172 | A1 | 6/2006 | Trainin | |
| 2011/0069628 | A1* | 3/2011 | Liu | H04W 74/0816 370/252 |
| 2011/0150004 | A1* | 6/2011 | Denteneer | H04L 5/0023 370/476 |
| 2012/0250617 | A1* | 10/2012 | Wentink | H04L 29/12839 370/328 |

(Continued)

FOREIGN PATENT DOCUMENTS

WO 2007/089989 A2 8/2007

OTHER PUBLICATIONS

Abichar et al.; "Group Based Medium Access Control for IEEE 802.11n Wireless LANs"; IEEE Transactions on Mobile Computing, vol. 12, No. 2, p. 304-317, Feb. 12, 2013.

*Primary Examiner* — Donald Mills
(74) *Attorney, Agent, or Firm* — Canon USA, Inc. I.P. Division

(57) ABSTRACT

The method improves data exchange on a wireless communication medium accessible by a plurality of nodes via a contention mechanism, the plurality of nodes comprising legacy nodes and a collaborative group of nodes, each node of the collaborative group being provided with a first and a second MAC address. The method comprises, upon successful contention at a first node of the group, at the first node: determining if a communication from a source node of the group to a legacy node is required, and in such a case, selecting the second MAC address of the source node as source address for issuing a request to access the medium (RTS), and, upon reception of a medium access authorization (CTS): transmitting first data to the legacy node using said second MAC address, and transmitting second data inside the group using said first MAC address.

17 Claims, 9 Drawing Sheets

(56) References Cited

U.S. PATENT DOCUMENTS

| | | | | |
|---|---|---|---|---|
| 2013/0287043 A1* | 10/2013 | Nanda | ............... | H04L 29/06068 370/467 |
| 2015/0139175 A1* | 5/2015 | Ratasuk | ................ | H04L 5/0051 370/330 |
| 2015/0188675 A1* | 7/2015 | Abeysekera | .......... | H04W 72/04 370/329 |

* cited by examiner

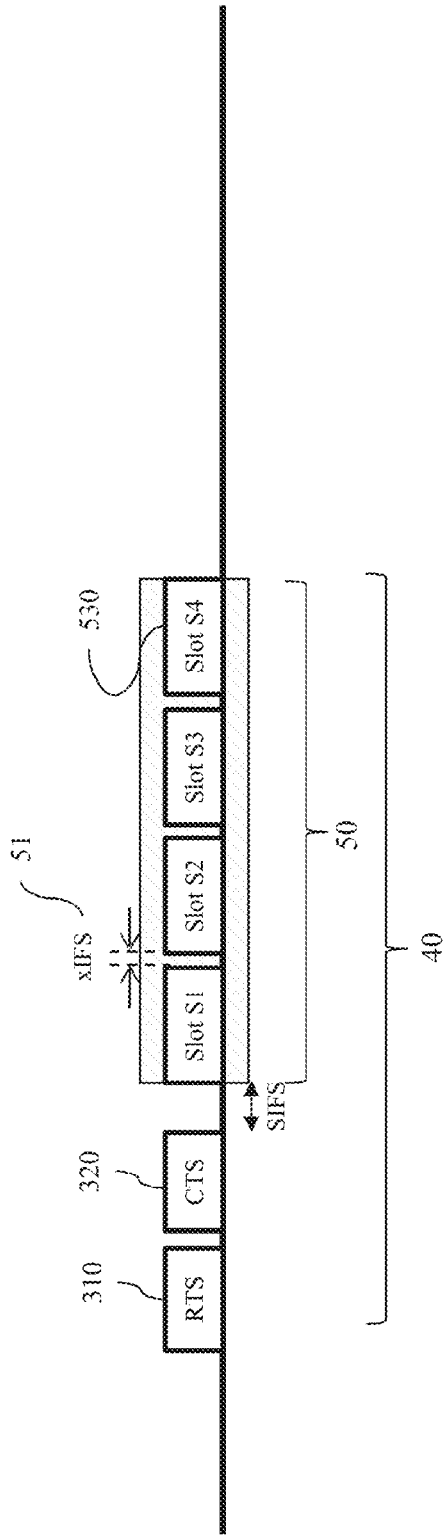
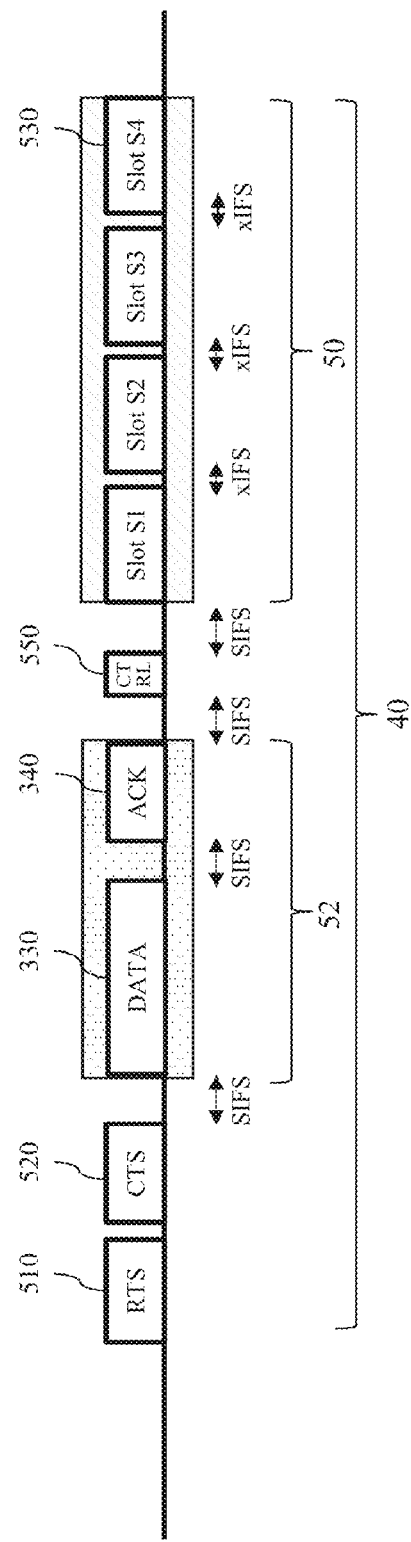
Figure 5a
Figure 5b

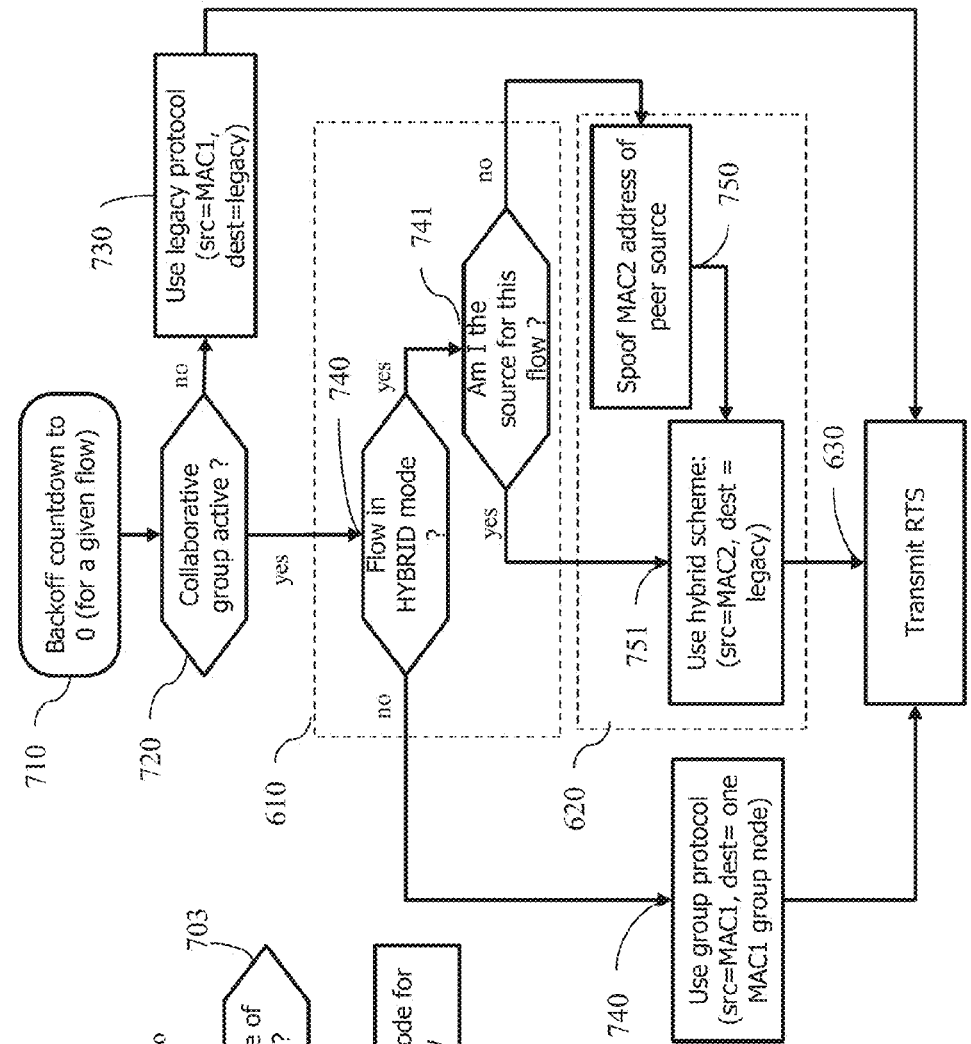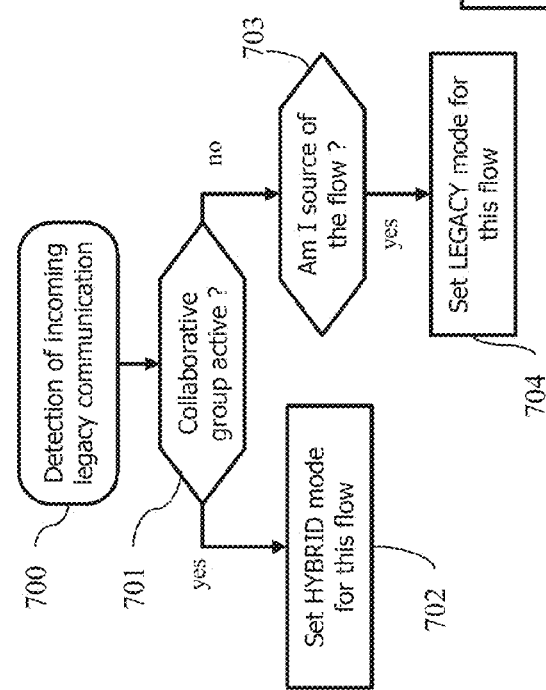

WIRELESS DATA EXCHANGE IN A NETWORK COMPRISING COLLABORATIVE NODES

CROSS-REFERENCE TO RELATED APPLICATIONS

This application claims the benefit under 35 U.S.C. §119 (a)-(d) of United Kingdom Patent Application No. 1220234.7, filed on Nov. 9, 2012 and entitled "Method, device computer program and information storage means for wireless data exchange in a network comprising collaborative nodes".

The above cited patent application is incorporated herein by reference in its entirety.

FIELD OF THE INVENTION

The invention lies in the technical field of wireless communication networks.

The invention pertains to optimizing data exchanges in a wireless communication network using Carrier Sense Multiple Access with Collision Avoidance (CSMA/CA), the network being accessible by a plurality of nodes.

BACKGROUND OF THE INVENTION

Wireless local area networks (WLANs), such as a wireless medium in a communication network using Carrier Sense Multiple Access with Collision Avoidance (CSMA/CA), are founded on the principles of collision avoidance. Such networks may also conform to a communication standard such as a communication protocol of 802.11 type e.g. Medium Access Control (MAC). The collision avoidance approach aims to separate concurrent transmissions in space and time. Packets of e.g. data are corrupted due to collision or channel fading. The transmitter remains unaware of the corruption and continues to transmit the entire packet unnecessarily. Eventually, based on the absence of an acknowledgment from the receiver, the transmitter infers packet loss, and prepares for retransmission.

The IEEE 802.11 standard defines the way WLANs must work at the physical and medium access control (MAC) level. Typically, the 802.11 MAC (Medium Access Control) relies on a contention-based mechanism based on a technique called "Carrier Sense Multiple Access with Collision Avoidance" (CSMA/CA). The standard 802.11 medium access protocol is essentially to wait for the medium to become idle.

Carrier sensing is performed by both physical and virtual mechanisms. The virtual carrier sensing is achieved by transmitting control packets to reserve the medium prior to transmission of data packets. The transmitter attempts to sense an idle medium for at least a DIFS (distributed interframe spacing) duration of time. If the medium is sensed busy, the transmitter waits until it becomes idle and then starts a countdown back-off timer set to expire after a number of slot times, chosen randomly between [0,CW] (i.e. the contention window CW being an integer value).

More precisely, the period of back-off timer countdown is called the 'back-off procedure', and is implemented as follows:
Upon starting the back-off process, prior to data transmission, a station initializes its back-off time counter to a 'random value'. The back-off time counter is decremented once every time interval for so long as the channel is sensed to be idle (e.g. with reference to FIG. 1, count down starting from T0), halted (or frozen) when a transmission is detected on the channel (e.g. with reference to FIG. 1, count down stopping at T1), and reactivated when the channel is sensed idle again (e.g. with reference to FIG. 1, T2). When its back-off time counter reaches zero, a station transmits a DATA message (or ready-to-send (RTS) message as explained hereafter) which contains the address of the receiver and the duration for which the medium is to be reserved for that message. A collision occurs when two or more stations start transmission simultaneously (e.g. when their own back-off counter has reached zero around the same time). Ideally, the same number of slots is present among all nodes forming the 802.11 cell during the back-off countdown procedure.

Since the CSMA/CA protocol does not rely on the capability of the stations to detect a collision by hearing their own transmission, a positive acknowledgement (ACK) is transmitted by the destination station to signal the successful packet reception. The ACK is immediately transmitted at the end of the packet, after a period of time called Short InterFrame Space (SIFS). If the transmitting station does not receive the ACK within a specified ACK Timeout, or it detects the transmission of a different packet on the channel, it reschedules the packet transmission according to the given back-off rules.

Collision Avoidance is more specifically enhanced by a four-way handshaking mechanism called RTS/CTS (request-to-send/clear-to-send) exchange, which is a recommended option of the 802.11 standard, and will be detailed with reference to FIG. 1.

US patent application 2009/0141738 A1 discloses a time slot system where a back-off counter value determination engine selects an unreserved time slot for a next transmission and a medium access engine for initiating a current transmission. This document uses a reservation-based distributed collision avoidance channel access in a wireless area network. By advertising the future channel access parameters in advance, nodes reduce the number of collisions. However, any extra functionality devised to maintain the reservation procedure adds overhead to the functioning of the device and consumes more bandwidth, both situations being very undesirable.

The present inventors have therefore envisaged using a collaborative medium access scheme for several nodes at a time, those nodes pertaining to a group of peer nodes, also called collaborative nodes. It is envisaged that there will also exist nodes outside of the collaborative group, and that communication between nodes inside and nodes outside the group may be required. Nodes outside the group may be referred to as legacy nodes. A legacy environment typically describes a situation where nodes are independent and do not interact or cooperate with each other, as opposed to the collaborative group of nodes. A peer node may request access to the shared 802.11 type medium according to the 802.11 legacy protocol, and upon grant of access, the node may communicate with one or more peer nodes according to a collaborative protocol during the reserved talk time. Thus, if the back-off count reduces to zero for one peer node among the group, said node reserves medium access (through classical RTS/CTS scheme) for the group and lets the group share this granted 802.11 timeslot.

A collaborative node can either communicate inside the group via the collaborative access scheme, or it communicates with legacy nodes outside the collaborative group using the 802.11 legacy protocol: thus no mixed mode is supported which would allow a collaborative node to communicate indifferently with peer nodes and legacy node.

Indeed, the collaborative group has no mean to know the communication timeslot which is going to be granted to a collaborative node for a legacy communication, which prevents a collaborative group communication to take place (as example a "time division multiple access", aka TDMA, communication). Therefore, a collaborative medium access scheme, like for example a distributed back-off mechanism, does not allow communicating with legacy nodes, except by leaving the collaborative sub-network, then eventually joining again after completing the data transmission with the legacy.

Thus aforementioned problems are limiting the optimal functioning of a wireless network.

SUMMARY OF THE INVENTION

It would be desirable, in particular, to improve the ability to communicate between legacy and collaborative nodes in a wireless communication network while also minimizing the overhead introduced for such a communication.

According to one aspect of the invention there is provided a method of data exchange on a wireless communication medium accessible by a plurality of nodes via a contention mechanism, the plurality of nodes comprising a collaborative group of nodes, each node of the collaborative group being provided with a first and a second MAC address, and, upon successful contention (i.e. the back-off counting of the node reaches zero) at a first node of the group, the method comprising at the first node:

determining if a communication from a source node of the group to a node outside the group is required, and in such a case, selecting the second MAC address of the source node as source address for issuing a request to access the medium (RTS), the method further comprising, transmitting first data from the source node to the node outside the group using said second MAC address as a source address, transmitting second data from the first node inside the group using its first MAC address as a source address.

The method allows a source node of the collaborative group transmitting first data outside the group and the first node transmitting second data inside the group. By using different MAC addresses, the transmission outside the group does not affect transmission/s inside the group and permits inserting a legacy node in a group communication. In particular the access scheme remains synchronized in term of backoff counting inside the group. The nodes of the group can thus continue collaborating while the nodes outside the group remains independent and do not cooperate with each other. The method is compliant with the 802.11 CSMA/CA standard.

In a particular embodiment the first node is the source node. So the method advantageously allows a node of the collaborative group issuing a single medium access request to transmit first data to a legacy node outside the group and to transmit second data inside the group.

According to another aspect of the invention there is provided a method of data exchange on a wireless communication medium accessible by a plurality of nodes via a contention mechanism, the plurality of nodes comprising a collaborative group of nodes, each node of the collaborative group being provided with a first and a second MAC address, and, upon detection by a second node of the group of a medium access request containing a second MAC address as source node address or a medium access authorization containing a second MAC address as destination node address, the method comprising:

transmitting first data from a source node to a node outside the group using said second MAC address as a source address, and transmitting second data from the second node inside the group using its first MAC address as a source address.

The method allows a source node of the collaborative group transmitting first data outside the group and the second node transmitting second data inside the group. By using different MAC addresses, the transmission outside the group does not affect transmission/s inside the group and permits inserting a legacy node in a group communication. In particular the access scheme remains synchronized in term of backoff counting inside the group. The nodes of the group can thus continue collaborating while the nodes outside the group remains independent and do not cooperate with each other. The method is compliant with the 802.11 CSMA/CA standard.

In a particular embodiment the second node is the source node. So the method advantageously allows a node of the collaborative group detecting a particular medium access request or authorization to transmit first data to a legacy node outside the group and to transmit second data inside the group.

In one embodiment the transmitting of the second data is realized from at least one node of the group to another node of the group. This feature allows a plurality, even all, nodes from the group to transmit (second) data using the same communication opportunity.

In an embodiment a time slot is requested by a medium access request (RTS) and granted upon a medium access authorization (CTS), the first and second transmission being realized within the granted time slot. These features allow optimizing the usage of the granted time slot by sharing it for the two transmissions.

In a particular embodiment the first data transmission is separated from the second data transmission by a short control frame enabling the legacy node to interpret that second data is not destined to it.

In a further embodiment the short control frame communicates to the nodes of the group the time remaining from the granted time slot for the second data transmission. This allows optimizing the usage of the time in the granted time slot in a simple way.

In still a further embodiment a MAC address used as destination address of the short control frame is changed to the first MAC address of a node of the collaborative group. This allows to simply directing the message to the collaborative group. It also indicates that the first data transmission period is terminated.

In a particular embodiment, upon detection of a medium access request or authorization containing a second MAC address as a source address, at least one node of the group prepares second data to be transmitted inside the group in the said allocated time slot. These features allow the node to be ready to transmit second data at the time it will get the authorization to transmit.

In still a particular embodiment, upon detection of a medium access request or authorization containing a second MAC address, the node having the second MAC address prepares first data to be transmitted to the node outside the group. These features allow the source node to be ready to transmit data at the time it will get the authorization to transmit. These features apply also to the node having the requested of the current granted time slot.

In one embodiment, the first MAC address is used to communicate exclusively inside the group of nodes or exclusively outside the group whereas the second MAC address is used to combined communication inside and outside the group of nodes. It is therefore guaranteed that the MAC addresses are representative of the type of communication, in particular the second MAC address is representative of the mixed communication scheme (or hybrid mode) according the invention.

In an embodiment, the first address and second MAC addresses of the node of the group are representative of a same Media Access Control (MAC) entity. Therefore, the same component can advantageously be used as the MAC entity for each nodes of the group.

In a specific embodiment, the first and second MAC addresses are identified by managing an universally/locally bit. Therefore, the same base of MAC address can advantageously be used, with only one differentiating bit, in order to ease MAC address modification and type detection.

In one embodiment, all the first and second MAC addresses are exchanged and/or stored among the collaborative group. These features enable each node of the group to indemnify the type of communication (inside or outside the group).

In a particular embodiment, the plurality of nodes implement a back-off counting procedure to access the wireless medium, and the collaborative group of nodes implements a synchronized back-off counting such that each node of the group has a distinct back-off value. Further, the back-off counting is synchronized in each node of the group by managing a list of back-off values of the nodes of the group. These features guarantee that the nodes of the group remains synchronized in term of back-off counting, resulting in that a unique node of the group issue a medium access request at a given time, avoiding therefore collision for medium access requests inside the group.

The invention also pertain to a computer program comprising instructions for carrying out each step of the method when the program is loaded and executed by a programmable apparatus as well as an information storage means readable by a computer or a microprocessor storing instructions of a computer program, wherein it makes it possible to implement the method.

The invention further pertain to a node for data exchange on a wireless communication medium accessible by a plurality of nodes via a contention mechanism, the plurality of nodes comprising a collaborative group of nodes, each node of the collaborative group being provided with a first and a second MAC address,
the node comprising:
    a back-off management module for detecting a successful contention,
    a RTS/CTS module for determining if a communication from a source node of the group to a node outside the group is required,
    a MAC address management module for switching between the first and the second MAC addresses of the source node as source address for issuing a request to access the medium by the RTS/CTS module, according to the determination of the RTS/CTS module.

The invention also pertain to a node for data exchange on a wireless communication medium accessible by a plurality of nodes via a contention mechanism, the plurality of nodes comprising a collaborative group of nodes, each node of the collaborative group being provided with a first and a second MAC address, the node comprising:

a RTS/CTS module for detecting a first or second MAC address type in a medium access request as source node or in a medium access authorization as destination node address,
    a data transmission module for:
        transmitting first data to a node outside the group using the second MAC address, and
        transmitting second data inside the group using the first MAC address.

BRIEF DESCRIPTION OF THE DRAWINGS

The invention will now be further explained by reference to the drawings:

FIG. 5a illustrates a collaborative group communication timeline, without legacy communication;

FIG. 5b illustrates a collaborative group communication timeline including a legacy communication according to an embodiment of the invention;

FIG. 7 represents algorithms according to an embodiment of the invention performed at a peer node of the collaborative group;

DETAILED DESCRIPTION OF THE PREFERRED EMBODIMENTS

Figure 1:
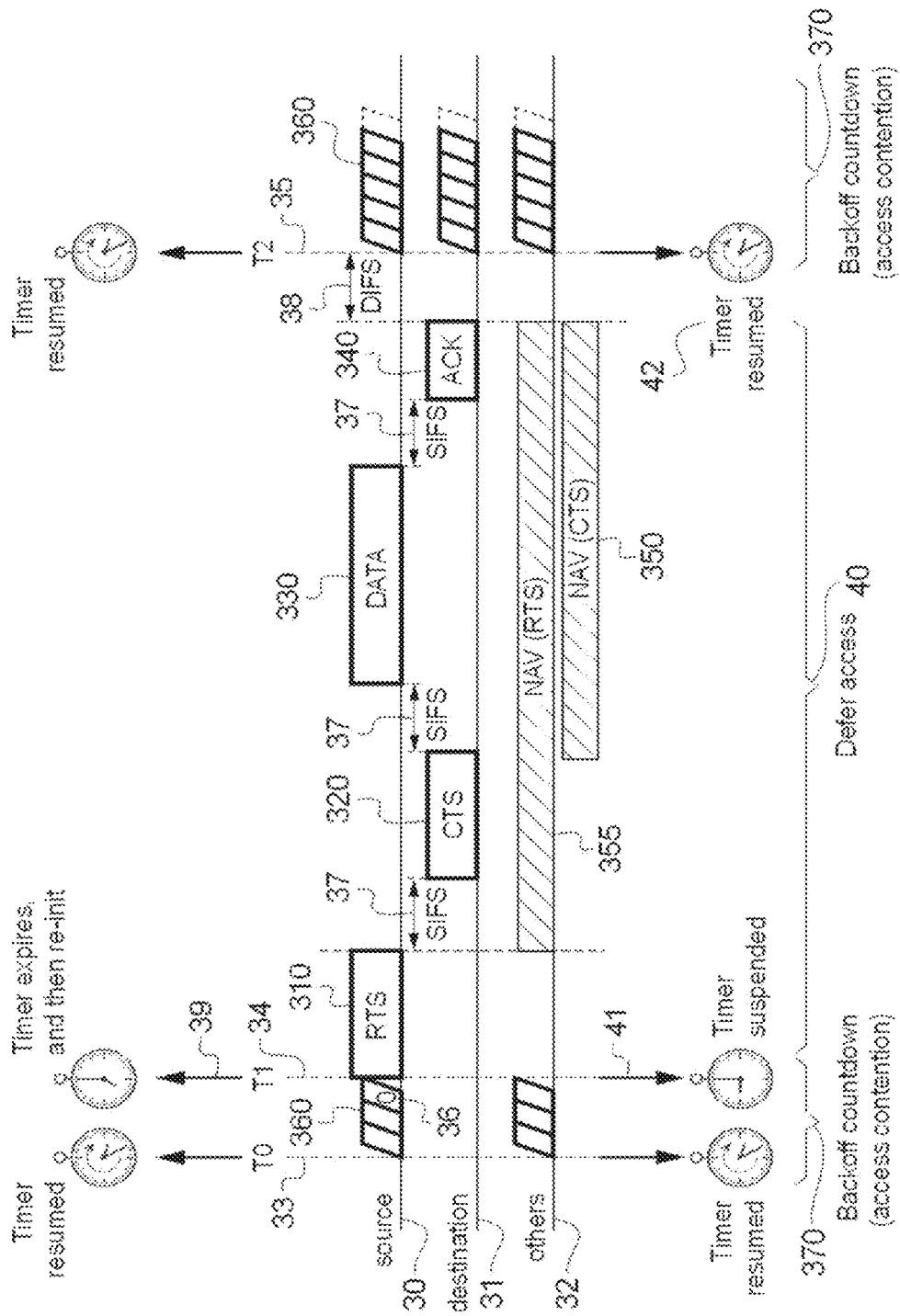
FIG. 1 illustrates a standard wireless medium access mechanism.

FIG. 1 depicts a standard access mechanism, facilitating access to a wireless medium for a node. The back-off procedure is one of the first processes to be implemented.

The figure illustrates the behavior of three groups of stations: source node 30, destination node 31 and other nodes 32.

Upon starting the back-off process prior to transmitting data, a station e.g. source node 30 initializes its back-off time counter to a 'random value' as explained above. The back-off time counter is decremented once every time slot 360 interval for so long as the channel is sensed idle (count down is starting from T0, 33 as shown in FIG. 1), 'frozen' or suspended when a transmission is detected on the channel (count down is stopping at T1, 34 as shown in FIG. 1), and reactivated when the channel is sensed idle again (as example at T2, 35 as shown in FIG. 1). When its back-off time counter reaches zero 36, the timer expires and then reinitializes 39. The station 30 transmits a data message, e.g. comprising RTS message 310, which contains the address of the receiver e.g. destination node 31 and the duration for which the medium is to be reserved for that message. Source node 30 expects to receive a CTS message 320 from destination node 31 before transmitting data 330. The messages are spaced using a SIFS (short inter-frame space) time interval 37, as required by the protocol.

The time unit in the 802.11 standard is the slot time called 'aSlotTime' parameter. This parameter is specified by the PHY (physical) layer (for example, aSlotTime is equal to 9 μs for the 802.11n standard). All dedicated space durations are multiple of this time unit.

The short inter-frame space 37 (SIFS) is used to separate a response frame from the frame that solicited the response, for example between a data frame and the acknowledgement response (for example, SIFS is equal to 16 μs for the 802.11n standard). The DCF inter-frame space (DIFS 38) defines the minimum waiting time for a transmitting node before trying to transmit some data (DIFS=SIFS+2* aSlotTime).

A collision occurs when two or more stations start transmission simultaneously (e-g when their own back-off counter has reached zero nearly at the same time). Ideally, a consistent number of slots 360 are seen as being expired by all nodes forming the 802.11 cell, e.g. during a back-off countdown procedure 370.

As the CSMA/CA protocol does not rely on the capability of the stations to detect a collision by hearing their own transmission of data 330, a positive acknowledgement 340 (ACK) is transmitted by the destination station 31 to signal the successful packet reception. The ACK 340 is immediately transmitted at the end of the packet, after a period of time equivalent to the SIFS 37. If the transmitting station does not receive the ACK 340 within a specified ACK Timeout, or it detects the transmission of a different packet on the channel, it reschedules the packet transmission according to the given back-off rules.

Collision avoidance is specifically enhanced by the four-way handshaking mechanism of RTS/CTS 310, 320 exchange, which is a recommended option of the 802.11 standard. FIG. 1 illustrates such a medium access protection scheme but it should be noted that the RTS/CTS handshake is optional in the standard and it is possible the exchange between nodes comprises only data 330 and ACK 340.

Usually, according to 802.11 standard, to protect transmissions from collisions, a station begins a transmission sequence with an RTS/CTS exchange 310, 320: a node 30 will issue a Medium access request (called Request-to-send, or RTS 310) to a destination node 31, when the sender node aims to transmit data on the 802.11 medium. The duration specified in the RTS 310 is the duration of the entire exchange including the control packets (that means including RTS/CTS message exchange) and subsequent data packets. When the intended receiver destination node 31 receives the RTS 310, and senses the medium to be free, such destination node replies a Clear-to-send (CTS 320) message after waiting for one SIFS 37 period, thus acknowledging the request and so accepting receiving data. The CTS 320 also contains the duration of the entire exchange from that point of time. The transmitter source node 30 upon receiving the CTS 320 transmits the DATA 330 packet after an SIFS 37 period. The receiver responds back with an ACK 340 after a SIFS 37 period following its complete receipt of the DATA 330 packet.

Each wireless node maintains a data structure called the network allocation vector or NAV to store the aggregate duration of time it knows that the medium would be busy. For example, the NAV associated with the RTS 310 and CTS 320 are illustrated, labeled 355 and 350 respectively. Any node (e.g. others 32 on FIG. 1) hearing a packet not destined for itself, sets its NAV for the time duration mentioned in the packet header, which is equal to the time required to transmit all control and data packets. Access for the other nodes 32 is deferred 40 by suspending 41 their associated timer and then later resuming 42 the timer when the NAV has expired. This prevents these other nodes 32 from transmitting any packets during the period the NAV is set. It is possible that the destination node 32 does not receive the RTS 310 correctly because of a collision or fading. Even if it does, it may not always respond with a CTS 320 because, for example, the NAV is set. In any case, the transmitter goes through the random back-off and retries. The RTS/CTS mechanism is very effective in terms of system performance, especially when large packets are being transmitted, as it reduces the length of the frames involved in the contention process. In fact, assuming perfect channel sensing by every station, collision may occur only when two (or more) packets are transmitted within the same slot time. If both transmitting stations employ the RTS/CTS mechanism, collision occurs only on the RTS frames, and it is early detected by the transmitting stations by the lack of CTS responses.

According 802.11 standard, the data frame 330 is unique and unicast (one source and one destination).

Figure 2:
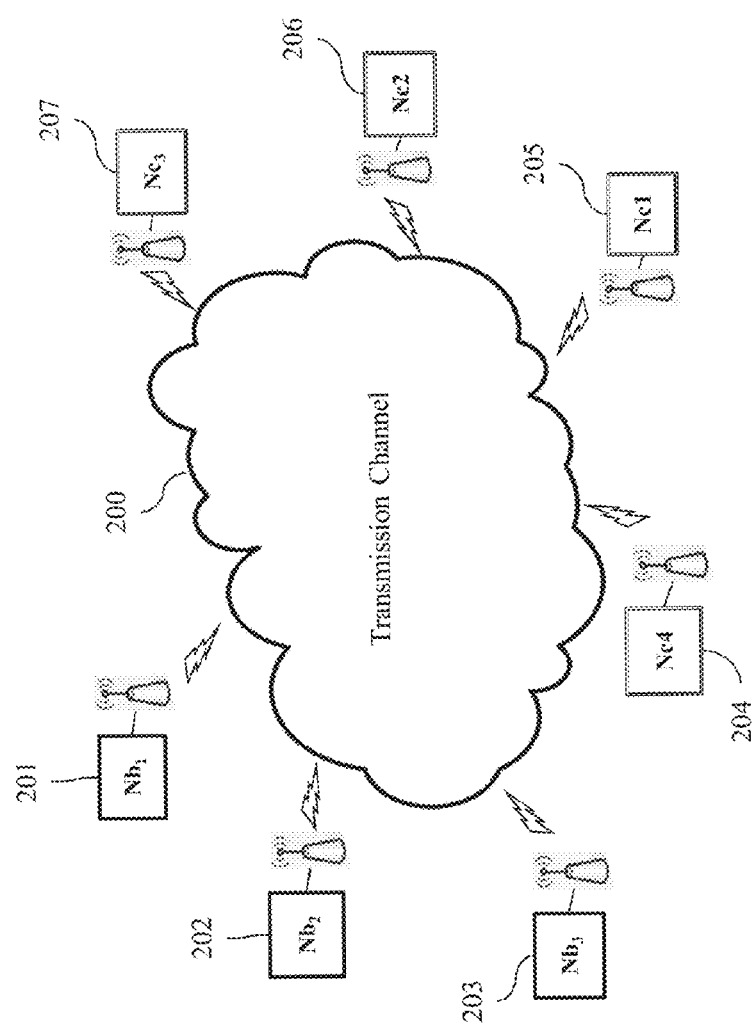
FIG. 2 illustrates a communication system capable of implementing embodiments of the current invention.

FIG. 2 shows an example of a communication system where the present invention can be implemented. In a network using a CSMA/CA channel access mechanism (for example a wireless network implementing the 802.11 standard or an equivalent standard of that type), several nodes 201, 202, 203, 204, 205, 206, 207 exchange data packets through a transmission channel 200 that may drop or corrupt the data packets.

Nodes can be divided into two groups: a first group of Nbi nodes 201 to 203 (where i is an integer between 1 and 3) implementing the 802.11 standard, also called legacy stations, and a second group of Ncj nodes 204 to 207 (where j is an integer between 1 and 4) implementing the 802.11 standard and an embodiment of the invention. The second group of node is also called the collaborative group. Data exchange among Nbi legacy nodes and Ncj collaborative nodes is managed through standardized 802.11n MAC/PHY layers.

Figure 3:
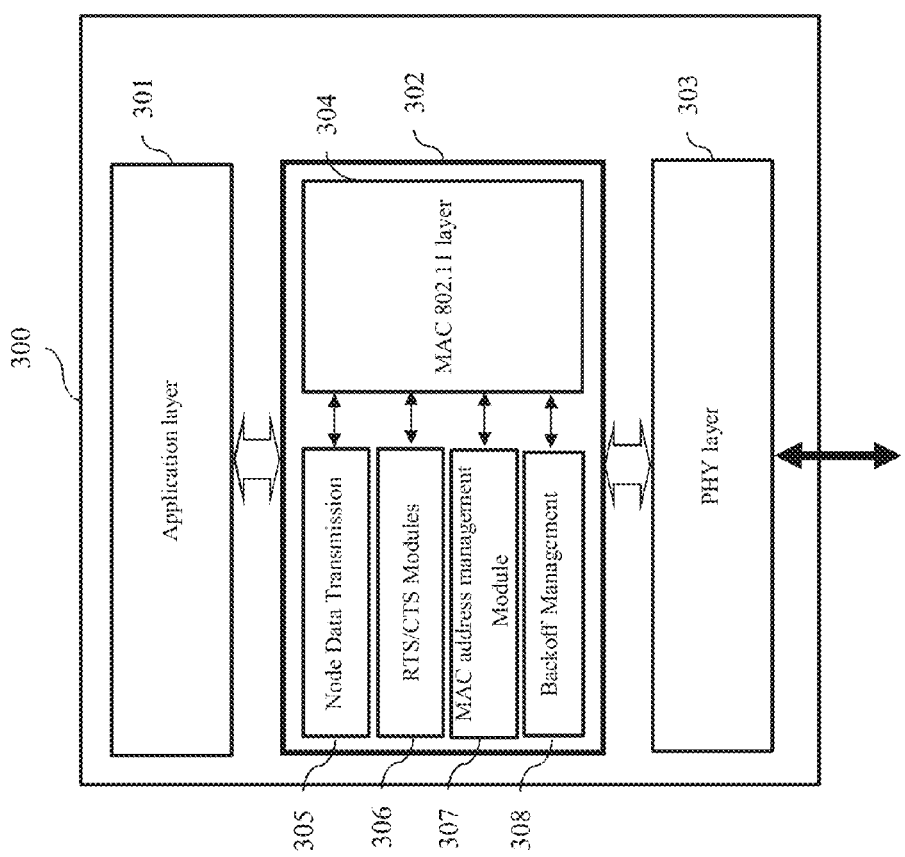
FIG. 3 illustrates a communication apparatus for a transmitting or receiving node adapted to incorporate the current invention.

FIG. 3 is a block diagram illustrating a schematic configuration of a communication apparatus 300 representing a transmitting node or a receiving node adapted to incorporate embodiments of the invention. The PHY (physical) layer block 303 is in charge of formatting data packets and sending data packets on the wireless medium. The MAC layer block 302 is composed of a standard MAC 802.11 layer 304 and four additional blocks implementing the invention:
  node data transmission block 305 in charge of exchanging data packet with the PHY layer and the application layer
  RTS/CTS modules 306 in charge of managing Request-To-Send (RTS) and Clear-To-Send (CTS) messages
  MAC address management module 307 capable of implementing an embodiment of the current invention,
  back-off management module 308 implementing the back-off management.

The application layer block 301 facilitates application generating and receiving data packets, for example video data flows.

Figure 4:
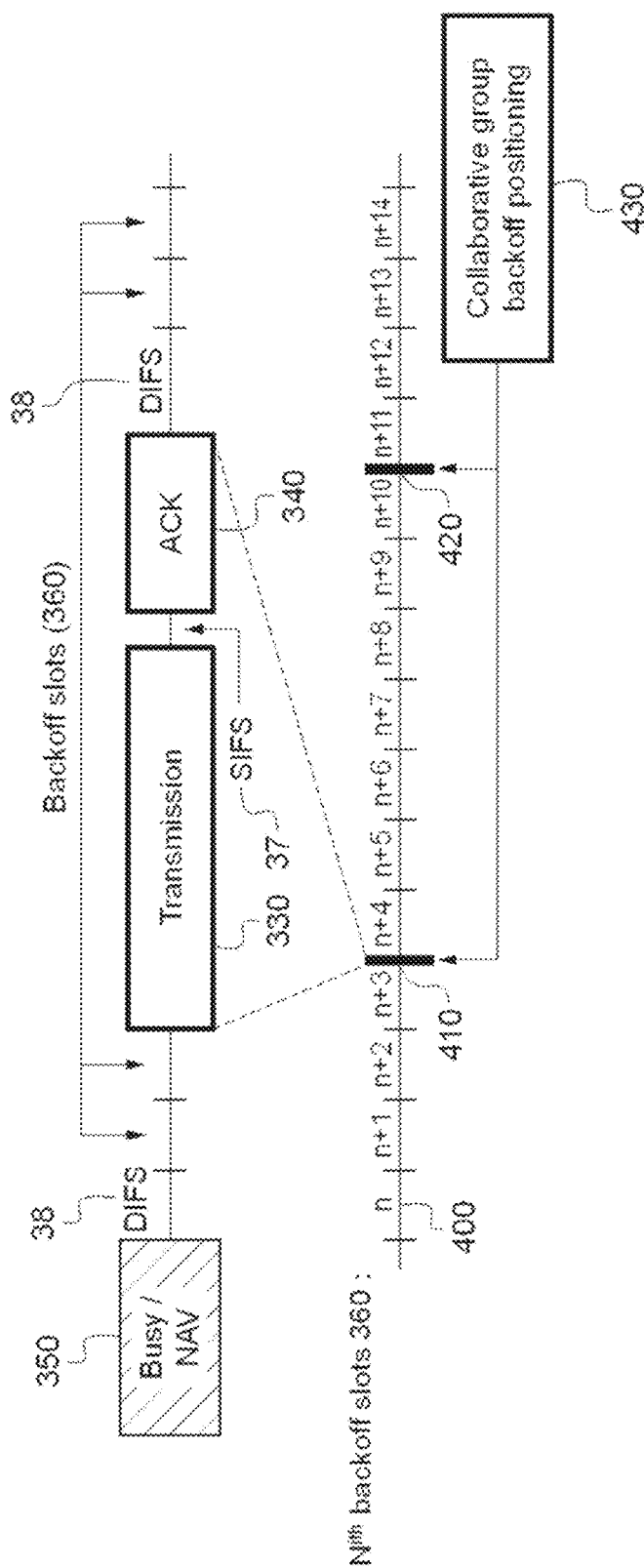
FIG. 4 illustrates a collaborative group back-off slot positioning.

FIG. 4 illustrates the collaborative group back-off slot positioning according to an embodiment of the invention.

While targeting an improved communication service on top of classical 802.11 type CSMA/CA (such as a TDMA communication for example), attention of the inventors has been directed on the grouping of a set of peer nodes among a 802.11 legacy environment to allow a collaborative medium access. TDMA here refers to a time division multiple access communication method used in conjunction with the 802.11 type MAC standard.

More precisely, medium access collaboration is performed by watching the 'random values' used to initialize the back-off time counters among the group, in order that no back-off time count duplication occurs. Each node may generate a virtual local image of its peers back-off time counters values by computing the back-off time of each of its peers, or have access by other means to said back-off values. Each node manages its own back-off time. Thus, each node of the group can predict the back-off time values of its peers and would attempt to access the wireless medium in a distinct back-off slot, avoiding any access collision among the group of peer nodes.

FIG. 4 illustrates this concept, in consideration of numbering any back-off slots 360 occurring in a CSMA/CA cell. The idea comprises spreading the allocation of back-off counts among the group of peer nodes to give a collaborative group back-off positioning 430. This is effected by positioning the back-off time expiration of each node of the collaborative group in a different slot number (as example, by considering an absolute scale of back-off slots, the current back-off count being number 'n' 400, the scheme would select 'n+3' 410 and 'n+10' 420 for two distinct peer nodes). The sharing of back-off slot positioning information may be performed either by messaging on the wireless channel, or in a preferred embodiment by pseudo-random generation of a next back-off slot computation according to the collaborative group back-off slot positioning scheme of an embodiment of the invention. The count of expired back-off slots (said going from n to n+1) is performed by wireless channel spying by each node of the collaborative group, whereby all collaborative nodes can see the medium activity (mainly idle and busy periods).

The sharing of back-off slot positioning information allows the collaborative nodes to synchronize their access to the medium and avoid collisions. However a communication with a legacy node outside the group risks introducing randomization effects on the back-off counters which are setup among the group, leading to back-off de-synchronization inside the group.

FIG. 5a illustrates a collaborative group communication timeline, without legacy communication.

With conventional wireless systems using techniques to provide medium access of the CSMA/CA type, only one particular node is allowed to transmit data during a specified period of time. Moreover, each node gets access to the medium randomly. Thus, such a random, performed on a station basis, allocation provides an inefficient use of the medium, which might become particularly critical when the node belongs to a group of nodes exchanging highly interactive data. Indeed, the communication between two nodes of the same group may be interrupted by an access to the medium by a legacy node not belonging to the group. It results that, the overall efficiency of the communication within the group is affected.

According to an embodiment of the invention there is provided a collaborative access method or protocol for accessing a communication medium used by a plurality of communication terminals, comprising a medium allocation scheme for several nodes of a collaborative group at a time. A collaborative node of the group Nci (204 to 207) may request access to a shared medium according to a legacy protocol, and upon grant of access, the node may communicate during a transmission opportunity TXOP 40 with one or more remote nodes according to a collaborative protocol (e.g. by using a TDMA access scheme). This collaborative protocol may support a high data rate, a high bandwidth physical layer transport mechanisms, or other modulation techniques different from the legacy protocol. As a result, this scheme avoids unnecessary waste of time in polling, contention, etc. due to the inherent IEEE 802.11 medium, by providing a method for contenting an IEEE 802.11 medium access timeslot and transmitting inside that timeslot in a different scheme.

When a node of the group is granted access to the communication medium, it may allocate a part of its access time slot 50 to other nodes in the group.

In the present example of FIG. 5a, the access time slot 50 is shared into four timeslots S1, S2, S3 and S4 (530) allowing data exchange between nodes Nc1, Nc2, Nc3 and Nc4 of the collaborative group. The timeslots 530 may have different durations and/or different distributions.

The xIFS 51 is a guard time interval between timeslots 530. The maximum limit for the guard time intervals is shorter than a SIFS so as not to let any IEEE 802.11 legacy node detect a change of medium talker during the TXOP 40 duration. Thus time slot period 50 is interpreted as a single data period, like data frame 330, by a legacy node. As reminder, a SIFS (Short Inter Frame Space) is used to separate individual frames in the IEEE 802.11 standard without the inter-frame interval being interpreted by the nodes as a change of medium owners.

As illustrated in FIG. 5a, a RTS message 310 is issued by the node Nci of the collaborative group which back-off count comes to zero (as example NC1), and such RTS message is indifferently addressed to any other node of the group (as example NC2, or Nc3 or Nc4). The addressed node will reply with a corresponding CTS message 320, destined to the RTS emitter node.

FIG. 5b illustrates a collaborative group communication timeline similar to FIG. 5a, including a legacy communication according to an embodiment of the invention.

The idea here is to allow a legacy communication (preferably in advance to) and the collaborative communication inside a same CSMA transmission opportunity TXOP 40. To do so, the collaborative nodes must detect a legacy timeslot 52 prior to collaborative access time slot 50. Therefore the proposed scheme jointly supports a standard MAC frame addressing to legacy node (so that legacy nodes are able to interpret the legacy communication slot 52) and a collaborative communication (such that legacy nodes interpret the collaborative slot 50 as a non-activity period, and so that the collaborative group communicates in slot 50). Such a communication scheme will be called "mixed-mode" scheme.

According the explanations related to back-off count management inside the collaborative group (FIG. 4), any peer nodes (indifferently Nc1, Nc2, Nc3 or Nc4 ) can issue the RTS 510 for requesting an access to the medium. In order to be compliant with legacy communication, the RTS should be standard compliant and addressed to a legacy node Nbi (Nb1 201 to Nb3 203).

So, the present embodiment proposes maintaining for each peer node of the collaborative group a set of two distinct MAC addresses (MAC stands for Medium Access Control), which are representative of this node in context of either internal (inside the collaborative group only) or external (including legacy node) support of communication. Following the requirement to communicate with a legacy node, a peer node uses either one of its two addresses when accessing the medium (RTS) through the synchronized collaborative protocol. Let's call these two MAC addresses MAC type 1 address (or MAC1) and MAC type 2 address (or MAC2), respectively for collaborative group only and legacy support communications (an alternative of using two separate MAC addresses is provided in regards to FIG. 9). All the MAC1 and MAC2 addresses are exchanged and stored among the collaborative group, for example while performing a group joining procedure (not detailed here). The two MAC addresses of each node are inserted into lists containing all MAC1 and MAC2 addresses of the peer nodes. The list is stored in a memory of each node of the collaborative group.

In order to keep benefit of back-off synchronization within the collaborative group (for avoiding collisions), the usage of legacy scheme (FIG. 1) for any of collaborative peer node issuing data to a legacy node should be avoided. It is therefore proposed that peer devices use a first type MAC address for collaborative proprietary communication and a distinct second type address when talking in a mixed mode as represented in FIG. 5b. The second type MAC address will be the one exported to and discovered by legacy devices. Upon issuing of an access request (RTS 510) on the 802.11 medium, when a legacy slot is required, a peer node uses the MAC address of the legacy node as destination MAC address of the RTS frame, and its MAC type 2 address as source MAC address of the RTS frame. The access is acknowledged (CTS 520) by the targeted legacy node. Using of the MAC type 2 address from a peer node of the group as source address in incoming RTS frame introduces a differentiating point. This supports interpretation by the other peer nodes of a mixed-mode scheme. The interpretation requires the collaborative nodes to analyze the MAC source address of any incoming RTS frame (not only the destination address) in order to determine if the pending transmission opportunity TXOP 40 (or at least part of it 52) is targeted to them or to a legacy node.

In addition, in order to keep compliance with the collaborative medium access protocol, as the peer device accessing the medium is not fixed among the group, an additional means is provided to masquerade a peer MAC address requesting legacy communication (here Nc1 205) by MAC address of a peer having its back-off to 0 (here the peer which masquerades Nc1 MAC address may indifferently be node Nc2 or Nc3 or Nc4 ). This would let more often legacy communication opportunity, even if Nc1 has not taken the medium request.

In order to be more compliant with 802.11 standard, it is advised to use a short control frame 550, between legacy communication slot 52 and TDMA communication slot 50, in order to let legacy device(s) know the remaining transmission opportunity TXOP that will be granted to other devices. This may be performed through the 802.11 Reverse Direction protocol, intended for allowing several exchange sequences within a single TXOP addressed to different recipient(s).

As we mix legacy 330 then proprietary 530 data in a same 802.11 transmission opportunity TXOP, granted by the collaborative group, the legacy node will be able to decode first data 330 (targeted to it) and then to interpret that second data 530 is not destined to it (thanks to the short control frame 550).

Figure 6:
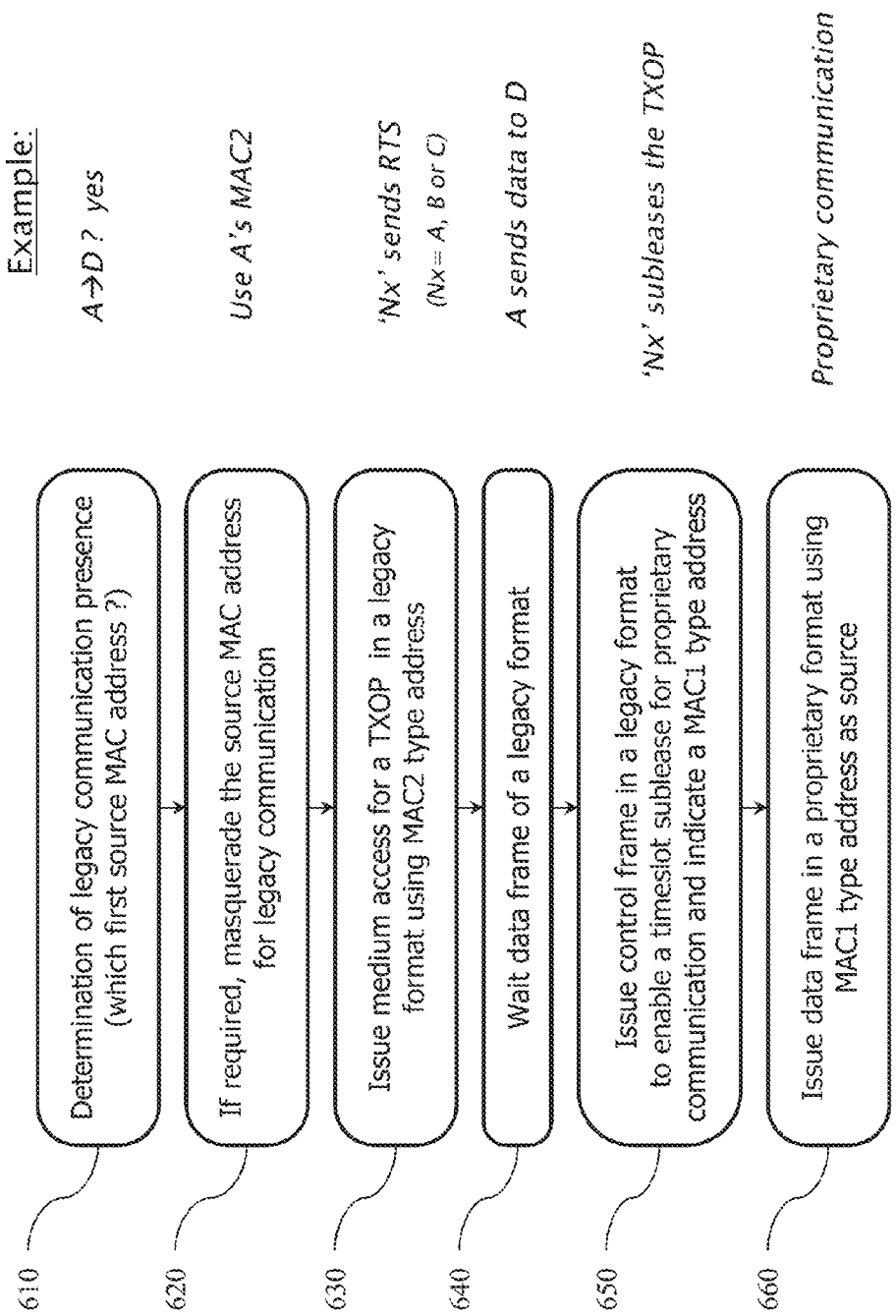
FIG. 6 illustrates a high level algorithm performed by a peer node of the collaborative group accessing the medium, in order to support the communication timeline according the FIG. 5b.

FIG. 6 illustrates a high level algorithm performed by a peer node of the collaborative group accessing the medium, in order to support the communication timeline according the FIG. 5b.

The peer node ready to access the medium is any node 'Nci' of the group having its back-off count down to zero, and will be further called the 'sender' peer node or the first node.

In case of positive determination 610 that some data have to be sent to a legacy node from a collaborative peer, the algorithm can be performed further. The destination MAC address is determined as the selected legacy node's MAC address. Any scheduling scheme may be used to do such a selection.

In step 620, a MAC2 address is selected as the source MAC address of the RTS frame to be issued. As the RTS sender peer device performing steps 610 to 660 is not fixed among the group (the sender peer is the node of the group having next back-off count down to zero), such sender peer has to masquerade as having the MAC2 address of the collaborative peer (from step 610) requesting legacy communication. Therefore the RTS sender peer uses the MAC2 address of peer having data to transmit (that is the "source" peer) to a legacy node.

At 630, the RTS frame is prepared and then sent to other nodes through the medium by the sender peer. In accordance with the embodiment of FIG. 5b, the sender peer transmits a RTS frame 510 with a duration field greater than required for the legacy transmission to prevent transmission by other legacy stations during the slot 50 sequence dedicated to data exchange inside the collaborative group. RTS frame's duration field contains value in microseconds of time needed to transmit legacy data 330 plus collaborative group data 530. The network allocation vector (NAV) of other legacy stations will be set accordingly to cover the transmission opportunity TXOP time 40 when receiving the RTS frame.

At 640, the sender node waits for the end of the legacy communication 52. In step 650, the sender peer node sends a control frame 550 which indicates the end of communication for the legacy node and the subleasing of the remaining time for other communications. In a preferred embodiment, a short frame according the 802.11n "reverse direction" (RD) feature is used. With RD, once the transmitting sender peer station has obtained the transmission opportunity TXOP 40, it may grant permission to other station to send information back during its TXOP. The sender peer is seen as a RD initiator, and sends its permission to a RD responder node using a Reverse Direction Grant (RDG) in the RDG/More PPDU field of the HT Control field in the MAC frame. This bit is used by the RD initiator for granting permission (RDG) to the RD responder, and it is used by the RD responder to signal whether or not it is sending more frames immediately following the one just received.

According the RD protocol, during an RD exchange sequence, the RD initiator station may transmit PPDUs and obtain response PPDUs from a single station (RD responder) during the exchange. As a result, in an optional embodiment, the control frame 550 is not used but the first slot S1 530 embeds the Reverse Direction Grant (RDG). This mode is preferably set when the sender peer is currently the source peer of the determined legacy flow.

In step 660, the MAC address used as destination address of the control frame 550 (or optionally the first slot S 530) is changed to the MAC addresses of type 1 of one node of the collaborative peers.

Further, each peer node waits for its TDMA slot 530 in order to convey data according to the collaborative communication scheme.

FIG. 7a illustrates a legacy flow admission according to an embodiment of the present invention performed by a collaborative peer node upon admitting a new legacy flow.

Upon discovery of a request to emit data flow to a legacy device at 700, each node Nci has to detect at 701 if the collaborative group is active. The group is considered active if data have to be transmitted inside the group. Several known utilities support how to detect an incoming legacy flow can be performed. As examples, Generic Advertisement Service (GAS) which provides for Layer 2 transport of an advertisement protocol's frames between a mobile device and a server in the wireless network; also upper high layer protocols, like UPnP for "Universal Plug and Play" network protocol promoted by the UPnP Forum, etc. In case the collaborative group is not active (701 negative) and if the node checks it is the source of the legacy flow (703 positive) the node sets to a legacy mode.

In case the collaborative group is active (701 positive) the node sets to a hybrid mode.

Flow schedulers are present at each collaborative node associating a mode flag to each incoming flow in order to keep in memory the used mode (hybrid or legacy) for the flow.

FIG. 7b illustrates the algorithm performed by a sender peer node Nc of the collaborative group upon accessing the medium.

The algorithm is executed when the back-off counter of a sender peer node expires 710. The sender node first checks if it pertains to an active collaborative group 720. If this is not the case, the node uses a 802.11 legacy protocol, which is the unicast communication targeted to the legacy node. To do so, the sender node uses its MAC1 type address as source of RTS frame, and the MAC address of the legacy device as destination address.

If the test 720 is positive, the node uses either a collaborative communication scheme 50 according to FIG. 5a or a mix mode scheme according FIG. 5b. To distinguish between the two cases, the step 610 for determining a legacy communication presence is mainly composed of two tests. First to detect in a flow scheduler table the presence of an admitted flow labelled as an HYBRID mode. If such a label is absent, the collaborative communication scheme 50 of FIG. 5a is performed in step 740. If such a label is present, the mixed-mode scheme of FIG. 5b is applied: a second test 741 consists in determining if the sender peer node is the source of the detected admitted hybrid flow, in order to further obtain the correct MAC2 type address to use as source MAC address in the RTS frame.

If the source peer node is the sender one (741 positive), the MAC2 type address is its proper one. If the source peer is not the sender node (741 negative), the MAC2 type address of the source peer node corresponding to the detected admitted hybrid flow is extracted from its memory and spoofed by the sender node 750. After these steps, the sender node prepares its hardware to use the determined MAC2 address 751.

Then the medium access is performed at 630 using the determined MAC address.

Figure 8:
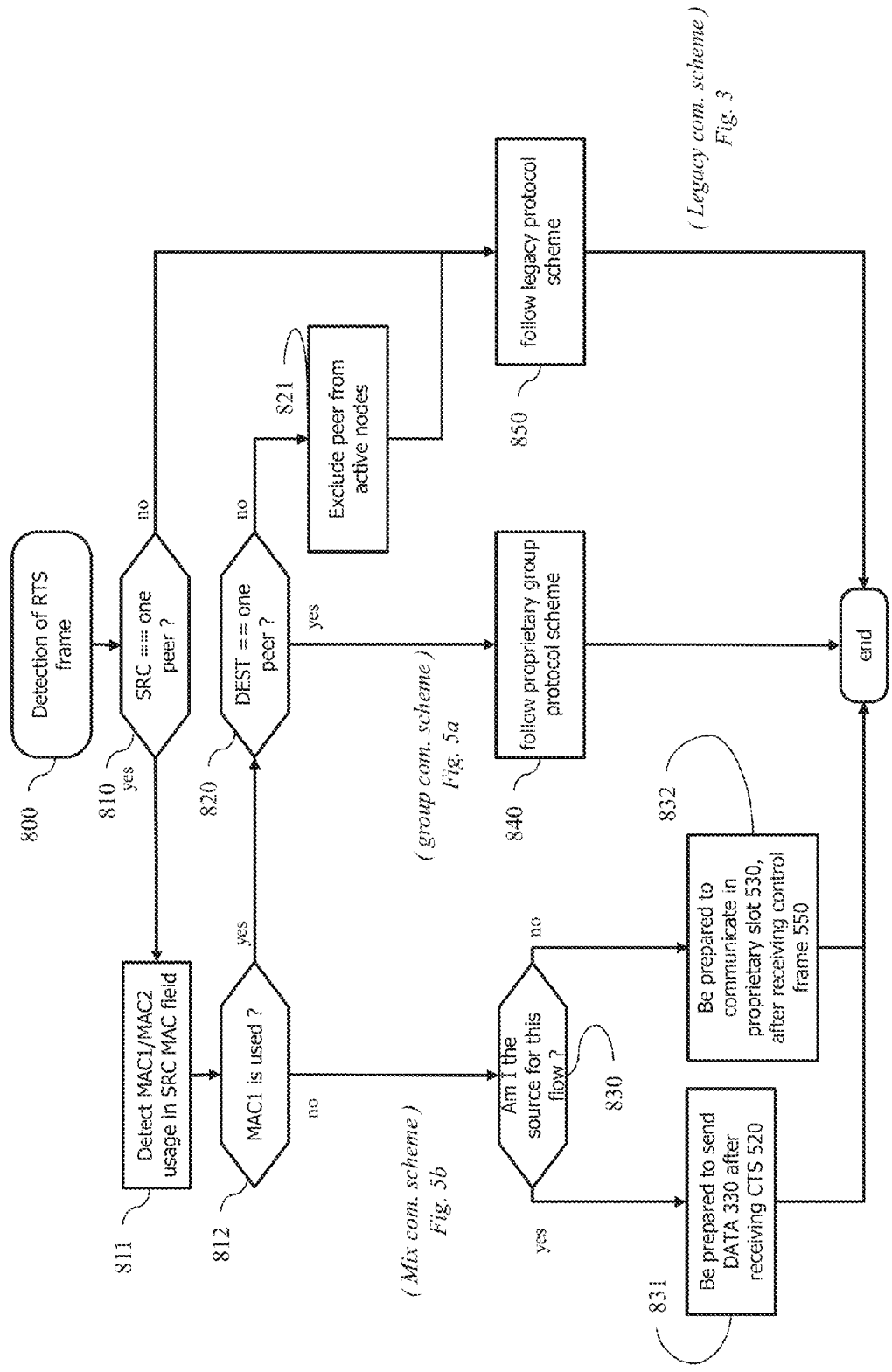
FIG. 8 illustrates an algorithm according to an embodiment of the invention performed at a peer node upon receiving a RTS frame; and, FIG. 9 illustrates additional means which may be implemented in accordance with an embodiment of the invention.

FIG. 8 illustrates the decisions performed at a peer node of the collaborative group receiving a RTS frame, in order to decide on which communication scheme the current frame exchange will rely.

In step 800, a RTS frame 310,510 is received by a receiving peer node of the group.

The receiving node checks 810 whether the MAC source address of the RTS frame belongs to the MAC1 or MAC2 list of the group. If this is not the case, the frame originates from a legacy device, which follows the 802.11 standard protocol, so the algorithm ends at step 850 by following a legacy protocol (as example, by setting its NAV if it is not the destination of the RTS frame).

If the check 810 is positive (the found MAC source address corresponds to a peer, 811 and 812 check the type of MAC address used, and redirect to step 830 if a MAC2 type address is used, otherwise to 820 if a MAC1 address is used.

Going to test 820, a receiving peer node should only communicate via collaborative scheme, so that the destination address specified in the RTS frame should be part of MAC1 address of a peer. If this is the case, then the communication scheme to be followed is the collaborative scheme 840 of FIG. 5a. In case the MAC address used in the destination address specified in RTS frame is unknown in the group (test 820 negative), then the sender peer is considered as fault because it has used the collaborative medium access for a legacy communication (the effect we want avoid) and it is banned from the group at 821.

If the test 812 result is negative, MAC2 type address is used, then the mix communication scheme as described in regards with FIG. 5b is used. The receiving peer is now aware of the communication scheme to use. It has further to determine if it is allowed to send data, according to the flow considered for the legacy timeslot 52. The flow determination (step 830) consists in retrieving which node is linked with MAC2 address of the source MAC address of the received RTS frame. If the address corresponds to the address of the receiving node (830 positive), step 831 is executed, consisting in waiting for the CTS frame 520 (from legacy node) before issuing the data flow 330 on the medium to legacy node destination. The other receiving nodes for which test 830 result is negative, execute step 832, consisting in waiting for the collaborative timeslot 50 to start.

Figure 9:
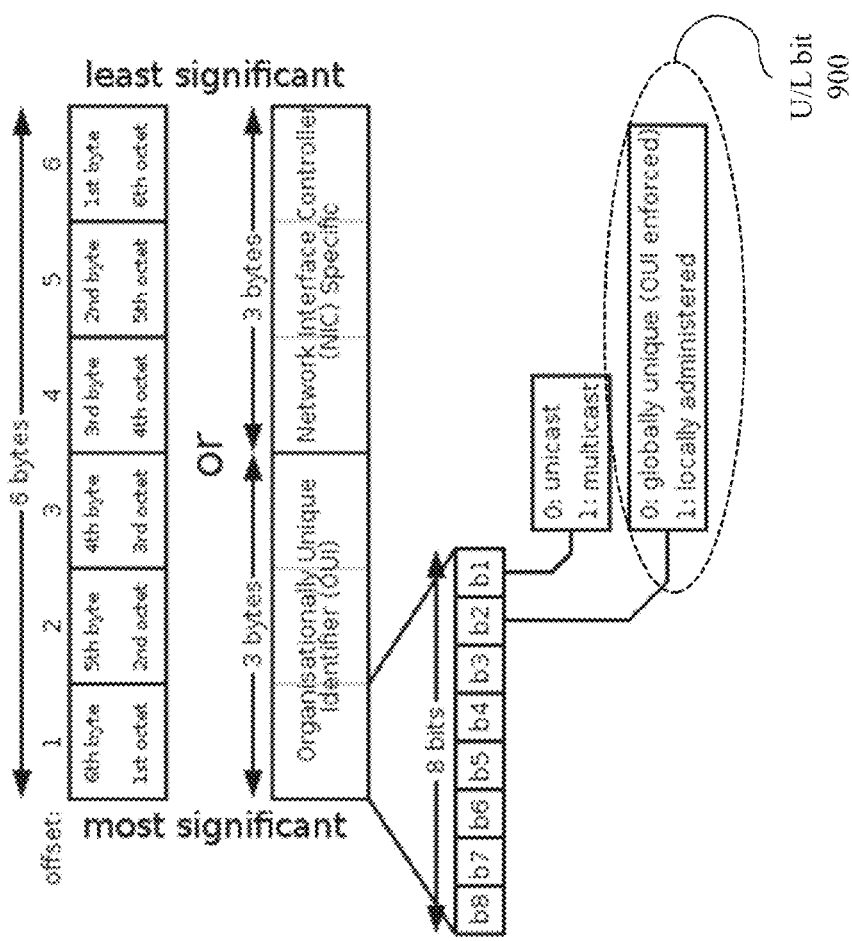

FIG. 9 represents an IEEE 802 48-bit address space illustrating a particular way of designing the MAC1 and MAC2 type addressing concept.

Although intended to be a permanent and globally unique identification, it is possible to change the MAC address on most modern hardware. As example, changing MAC addresses is necessary in network virtualization. It can also be used in the process of exploiting security vulnerabilities.

It is proposed to distinguish between MAC1 and MAC2 addresses, as is explained hereafter.

IEEE Std 802.11 has chosen to use the IEEE 802 48-bit address space (defined in 5.2 of IEEE Std 802-1990), which is represented as a string of six octets (see FIG. 9). The octets are displayed from left to right, in the order that they are transmitted on the LAN medium, separated by hyphens. Each octet of the address is displayed as two hexadecimal digits. The bits within the octets are transmitted on the LAN medium from left to right. In the Binary Representation the first bit transmitted, of each octet, on the LAN medium is the least significant bit of that octet (b1).

Addresses can either be universally administered addresses or locally administered addresses. Universally administered and locally administered addresses are distinguished by setting the second-least-significant bit of the most significant byte of the address (900). This bit is also referred to as the U/L bit, short for Universal/Local, which identifies how the address is administered. If the bit is 0, the address is universally administered. If it is 1, the address is locally administered.

A universally administered address is uniquely assigned to a device by its manufacturer; these are sometimes called burned-in addresses. The first three octets (in transmission order) identify the organization that issued the identifier and are known as the Organizationally Unique Identifier (OUI). The following three octets are assigned by that organization in nearly any manner they please, subject to the constraint of uniqueness.

A locally administered address is assigned to a device by a network administrator, overriding the burned-in address. Locally administered addresses do not contain OUIs.

In this particular embodiment, it is proposed to keep relying on the universally administered address, but to manage the usage of the U/L bit in order to distinguish between MAC1 or MAC2 type addresses (in regards to collaborative group according the invention). As example, U/L bit 900 is set to 1 for emulating a MAC2 type according the invention.

The invention claimed is:

1. A method of data exchange on a wireless communication medium accessible by a plurality of nodes via a contention mechanism, the plurality of nodes comprising a collaborative group of nodes, each node of the collaborative group being provided with a first and a second MAC address, the method comprising at a first node of the group:
   determining if a communication from a source node of the group to a node outside the group is required, and in the event of a positive determination,
   selecting the second MAC address of the source node as source address for issuing a request to access the medium,
   requesting a time slot by issuing a request to access the medium with the second MAC address of the source node as source address,
   receiving a medium access authorization granting the time slot, the method further comprising,
   transmitting first data from the source node to the node outside the group using said second MAC address as a source address,
   transmitting second data from a node of the group using its first MAC address as a source address, to another node of the group,
   wherein both the transmission of first data and transmission of second data are realized within the granted time slot and the first data transmission is separated from the second data transmission by a short control frame,
   and wherein a MAC address used as a destination address of the short control frame is the first MAC address of a node of the collaborative group.

2. The method of claim 1 wherein the first node is the source node.

3. The method of claim 1 wherein the medium access request is an RTS and the medium access authorization is a CTS.

4. The method of claim 1 wherein the short control frame communicates to the nodes of the group the time remaining from the granted time slot for the second data transmission.

5. The method of claim 1 wherein upon detection of a medium access request or authorization containing a second MAC address as a source address, at least one node of the group prepares second data to be transmitted inside the group in the said granted time slot.

6. The method of claim 1 wherein upon detection of a medium access request or authorization containing a second MAC address, the node having the second MAC address prepares first data to be transmitted to the node outside the group.

7. The method of claim 1 wherein the first MAC address is used to communicate exclusively inside the group of nodes or exclusively outside the group whereas the second MAC address is used for combined communication inside and outside the group of nodes.

8. The method of claim 1 wherein the first address and second MAC addresses of the node of the group are representative of a same Media Access Control (MAC) entity.

9. The method of claim 1 wherein the first and second MAC addresses are identified by managing a universal/local bit.

10. The method of claim 1 wherein all the first and second MAC addresses are exchanged and/or stored among the collaborative group.

11. The method of claim 1 wherein the plurality of nodes implement a back-off counting procedure to access the wireless medium, and the collaborative group of nodes implements a synchronized back-off counting such that each node of the group has a distinct back-off value.

12. The method of claim 11 wherein the back-off counting is synchronized in each node of the group by managing a list of back-off values of the nodes of the group.

13. A non-transitory computer readable medium storing a computer program comprising instructions for carrying out the method according to claim 1.

14. A method of data exchange on a wireless communication medium accessible by a plurality of nodes via a contention mechanism, the plurality of nodes comprising a collaborative group of nodes, each node of the collaborative group being provided with a first and a second MAC address, and, upon detection by a second node of the group of a medium access request containing a second MAC address as source node address or a medium access authorization containing a second MAC address as destination node address, the method comprising:
   transmitting first data from a source node to a node outside the group using said second MAC address as a source address, and
   transmitting second data, inside the group, from the second node using its first MAC address as a source address,
   wherein both the transmission of the first data and the second data are realized within a time slot requested by the detected medium access request or granted by the detected medium access authorization, and the first data transmission is separated from the second data transmission by a short control frame,
   and wherein a MAC address used as destination address of the short control frame is the first MAC address of a node of the collaborative group.

15. The method of claim 14 wherein the second node is the source node.

16. A node for data exchange on a wireless communication medium accessible by a plurality of nodes via a contention mechanism, the plurality of nodes comprising a collaborative group of nodes, each node of the collaborative group being provided with a first and a second MAC address, the node comprising:
   a memory;
   a processor coupled to the memory which executes the following:
   a RTS/CTS module configured to determine if a communication from a source node of the group to a node outside the group is required,
   a MAC address management module configured to switch between the first and the second MAC addresses of the source node as source address for issuing a request to access the medium by the RTS/CTS module, in the event of a positive determination by the RTS/CTS module; and a data transmission module configured to, in the event a medium access authorization granting a time slot is received in response to the issued request:
  transmit first data from the source node to the node outside the group using said second MAC address as a source address;
  transmit second data, inside the group, from a node using its first MAC address as a source address; and
  wherein both the transmission of first data and transmission of second data are realized within the granted time slot and the first data transmission is separated from the second data transmission by a short control frame,
and wherein a MAC address used as destination address of the short control frame is the first MAC address of a node of the collaborative group.

17. A node for data exchange on a wireless communication medium accessible by a plurality of nodes via a contention mechanism, the plurality of nodes comprising a collaborative group of nodes, each node of the collaborative group being provided with a first and a second MAC address, the node comprising:
  a memory;
  a processor coupled to the memory which executes the following:
  a RTS/CTS module configured to detect a first or second MAC address type in a medium access request as source node or in a medium access authorization as destination node address,
  a data transmission module
  configured to, in the event the RTS/CTS module detects a second MAC address type in a medium access request as source node or in a medium access authorization as destination node address, transmit second data inside the group in a time slot requested by the detected medium access request or granted by the detected medium access authorization, wherein the second data transmission is preceded by a first data transmission from a source node to a node outside the group using a second MAC address as a source address,
  and wherein the first data transmission is separated from the second data transmission by a short control frame, and a MAC address used as destination address of the short control frame is the first MAC address of a node of the collaborative group.

* * * * *